(12) United States Patent
Dole et al.

(10) Patent No.: US 6,918,278 B2
(45) Date of Patent: Jul. 19, 2005

(54) PIPE PREPARATION TOOL ADAPTABLE FOR DIFFERENT DIAMETER PIPES

(75) Inventors: Douglas R. Dole, Whitehouse Station, NJ (US); Ronald R. Snyder, Sr., Schnecksville, PA (US)

(73) Assignee: Victaulic Company of America, Easton, PA (US)

( * ) Notice: Subject to any disclaimer, the term of this patent is extended or adjusted under 35 U.S.C. 154(b) by 91 days.

(21) Appl. No.: 10/601,230

(22) Filed: Jun. 20, 2003

(65) Prior Publication Data

US 2004/0255632 A1 Dec. 23, 2004

(51) Int. Cl.[7] .................................................. B21D 3/02
(52) U.S. Cl. ........................ 72/123; 72/120; 72/121; 72/107
(58) Field of Search .......................... 72/102, 105, 106, 72/107, 110, 118, 120, 121, 122, 123, 126

(56) References Cited

U.S. PATENT DOCUMENTS

| | | | |
|---|---|---|---|
| 2,475,216 A | * 7/1949 | Barker | 72/104 |
| 2,975,819 A | 3/1961 | Costanzo et al. | 153/9 |
| 3,015,502 A | 1/1962 | Frost et al. | 285/112 |
| 3,071,993 A | 1/1963 | Foster, Sr. et al. | 81/15 |
| 3,283,553 A | 11/1966 | Taylor | 72/116 |
| 3,473,359 A | 10/1969 | Joslin | 72/121 |
| 3,748,933 A | 7/1973 | DeShazor | 82/4 C |
| 3,867,824 A | 2/1975 | Takagi et al. | 72/118 |
| 3,903,722 A | 9/1975 | Thau, Jr. et al. | 72/105 |
| 3,985,051 A | 10/1976 | Brown | 82/101 |
| 3,995,466 A | 12/1976 | Kunsman | 72/106 |
| 4,279,181 A | 7/1981 | Birkestrand | 82/21 A |
| 4,389,867 A | * 6/1983 | Whitlock | 72/126 |
| 4,445,352 A | * 5/1984 | Pols | 72/101 |
| 4,655,064 A | * 4/1987 | Hoback | 72/31.06 |
| 4,794,775 A | 1/1989 | Kuwahara et al. | 72/78 |
| 4,848,121 A | * 7/1989 | Rottinghaus | 72/31.06 |
| 4,873,856 A | 10/1989 | King | 72/121 |
| 5,329,797 A | 7/1994 | Calhoun | 72/121 |
| 5,481,893 A | * 1/1996 | Barjasteh et al. | 72/107 |
| 5,907,966 A | * 6/1999 | Moore | 72/121 |
| 6,666,062 B2 | * 12/2003 | Dole et al. | 72/121 |

FOREIGN PATENT DOCUMENTS

GB 2266482 * 11/1993 .......... B21D/15/06

OTHER PUBLICATIONS

Japanese Patent No. 11–207411, dated Aug. 3, 1999, Tool for Grooving Tube; see English Abstract.

* cited by examiner

*Primary Examiner*—Ed Tolan
(74) *Attorney, Agent, or Firm*—Synnestvedt & Lechner LLP

(57) ABSTRACT

A tool for preparing pipes for coupling using mechanical couplings is disclosed. The tool has a movable roller pivotally attached to a body, a tapered roller rotatably attached to the body and a plurality of tool rollers rotatably mounted on a carriage slidable within the body. Each tool roller has a chamfering flange, a grooving flange and a textured, surface for chamfering the pipe end, forming a groove in the pipe end and marking the pipe end. The carriage is movable to position a tool roller at a predetermined distance from the pipe centerline. The tapered roller and the movable roller support the pipe end at an equiangular spacing from the tool roller. The movable roller is actuated by a jackscrew to forcibly engage the tool roller with the pipe end as the tool is rotated about the pipe end circumference to form the chamfer, the groove and an insertion depth mark.

45 Claims, 9 Drawing Sheets

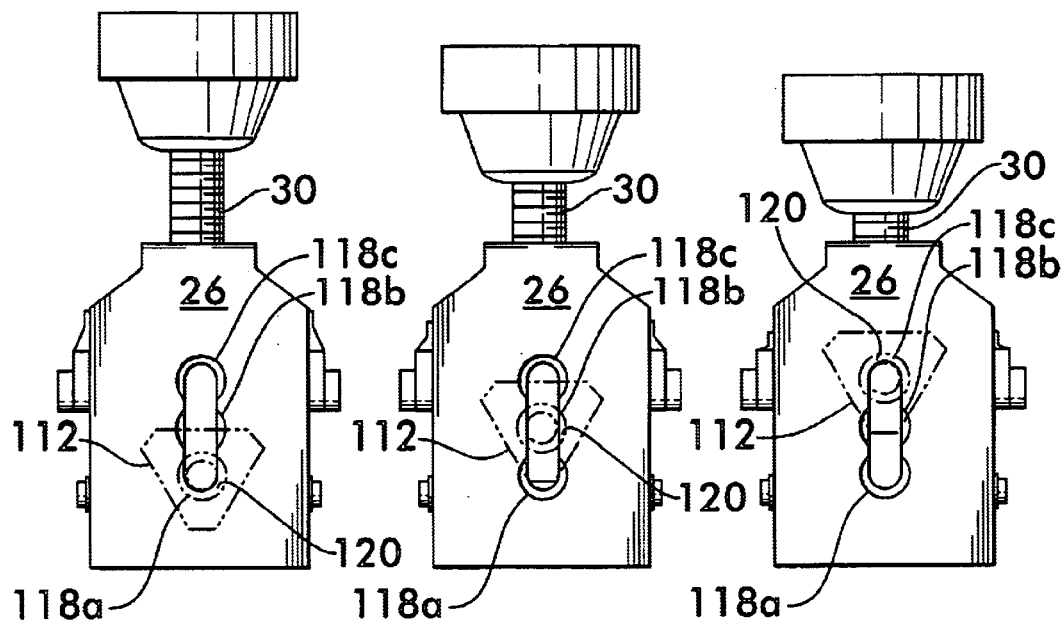
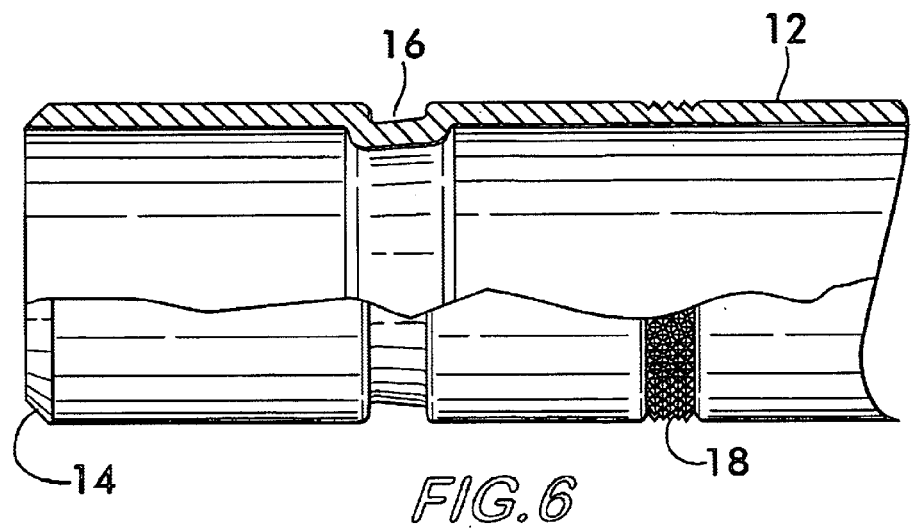

US 6,918,278 B2

PIPE PREPARATION TOOL ADAPTABLE FOR DIFFERENT DIAMETER PIPES

FIELD OF THE INVENTION

This invention concerns a tool for preparing pipe ends of various diameters to be received within a pipe coupling, the preparation including radiusing/chamfering, grooving and marking of the pipe ends.

BACKGROUND OF THE INVENTION

Piping networks formed by joining pipe segments using mechanical couplings require that the ends of the pipe segments be prepared to be received by the mechanical couplings. Mechanical couplings do not use solder, brazing or welding to effect a pipe joint. One type of mechanical coupling uses resilient, angularly oriented radial teeth located within a coupling housing to capture and retain the pipe segment within the housing. The end of the pipe segment is inserted axially into the housing where the teeth engage a groove formed in the outer surface of the pipe end. A fluid tight joint is effected by an elastomeric seal, such as an O-ring positioned within the housing and engaging both the housing and the pipe segment.

Another type of mechanical coupling uses arcuate clamping segments which are bolted to one another and fit circumferentially around adjacent pipe ends to hold them together. The clamping segments have circumferential keys that face radially inwardly toward the pipe ends and engage circumferential grooves formed in the outer surfaces of the pipe ends. A sealing element is located in an interior space between the clamping segments and the outer surface of the pipe end to effect a fluid tight seal.

To join pipe ends using mechanical couplings, pipe stock is cut to length and the end is then prepared for engaging the mechanical coupling by radiusing or chamfering the end of the pipe, forming a groove in the outer surface of the pipe in spaced relation to the radiusing/chamfered end, and forming a depth indicator mark on the pipe also in spaced relation to the pipe end. The radiusing/chamfered end acts as a lead in to permit the pipe to be more easily inserted into the coupling housing, retainer and elastomeric seal, the radiusing/chamfering process removing burrs or sharp edges which could damage the elastomeric seal. A radiused or chamfered end also allows the use of seal designs having more interference and/or greater radial compression which facilitates effective sealing over a wider range of pipe surface conditions, tolerances and ovality or out of roundness. The groove provides a bearing surface which the resilient teeth of the coupling can engage to hold the pipe end fast to the coupling against pressure loads, as well as other mechanical separation loads which may otherwise cause the pipe segment to separate from the coupling. The groove must be positioned at the proper distance from the chamfered end compatible with the coupling so that the elastomeric seal engages the pipe end when the teeth engage the groove in the pipe. The depth indicator mark is positioned at a distance from the pipe end so that, when the mark is aligned with a reference index on the coupling, it provides a visible indication that the groove has been engaged by the teeth and the pipe end is properly seated against an internal stop within the pipe coupling housing. Both of these internal features are not visible to the pipe installer, and hence the advantage provided by the depth indicator mark.

Pipe preparation devices use support rollers mounted on a rigid body to circumferentially engage and support the pipe end, with special tool rollers which radius or chamfer the pipe end and form the groove and depth indicator mark when the device is rotated relatively to the pipe end. For smaller pipe diameters, this process can be effected manually in much the same way as small diameter pipe segments are cut using a pipe cutter. However, merely adapting a pipe cutter to radius or chamfer and groove pipe ends has various disadvantages. The same tool roller cannot be used to prepare pipes of differing diameters because the spacing between the radius/chamfer, the groove and the depth indicator mark is different for each different diameter. Thus, separate tools or interchangeable tool rollers are required depending upon the diameter of the pipe being prepared. Furthermore, the force required between the tool roller and the pipe to form the radius/chamfer, groove and depth indicator mark may cause the pipe end to distort unacceptably into an out of round shape, rendering the pipe end useless because, being excessively out of round, it will not be insertable into the coupling. Pipe end distortion will occur most often when the support rollers and the tooling rollers are not properly spaced at substantially equal angles circumferentially about the pipe end. Rollers on typical pipe cutters do not support the pipe end at equal spacings and the geometry of the rollers is not variable to accommodate pipe segments having different diameters.

There is clearly a need for a pipe preparation tool which is adaptable to different pipe diameters and which will have less potential for distorting the pipe end out of round.

SUMMARY AND OBJECTS OF THE INVENTION

The invention concerns a tool for preparing a pipe end for engaging a mechanical pipe coupling. The tool comprises a body and a first roller rotatably mounted on the body and having a first outwardly facing surface engageable with the pipe end. A second roller is rotatably mounted on the body and has a second outwardly facing surface engageable with the pipe end, the second roller being movable relative to the body. A carriage is movably mounted on the body facing the first and second rollers. A plurality of third rollers is rotatably mounted on the carriage, each of the third rollers having an outwardly facing surface engageable with the pipe end. The first, second and third rollers are positioned in spaced relation about a central axis. An actuator is mounted on the body for moving the second roller generally toward and away from the central axis. The third rollers each are positioned at a different distance from the central axis. The pipe end is positionable along the central axis for engagement with the rollers. The body and the pipe end are rotatable relatively to one another about the central axis so as to engage the rollers circumferentially around the pipe end. The actuator forcibly engages the rollers with the pipe end, at least one of the rollers having a tool surface on the outwardly facing surface for preparing the pipe end. The carriage is movable so as to adjustably position each of the third rollers in a predetermined spaced relation to the first and second rollers one at a time, thereby adapting the tool to accommodate pipe ends having varying diameters.

Preferably, the tool comprises a pivot arm having one end pivotally mounted on the body and a free end pivotally movable toward and away from the central axis. The second roller is rotatably mounted on the free end of the pivot arm, and the actuator engages the pivot arm for moving the movable roller toward and away from the central axis.

The actuator may comprise a jackscrew mounted on the body, the jackscrew engaging the free end of the pivot arm.

Rotation of the jackscrew in one direction relatively to the body moves the second roller toward the central axis for forcibly engaging the rollers with the pipe end, and rotation of the jackscrew in an opposite direction moves the movable roller away from the central axis for disengaging the rollers from the pipe end.

Preferably, one of the rollers comprises a tapered roller having a lengthwise taper angle formed by the tapered roller having a smaller diameter at one end and a larger diameter at an opposite end. The tapered roller has an axis of rotation oriented at an angle to the central axis, the angle being substantially equal to the taper angle so as to permit engagement of the outwardly facing surface of the tapered roller with the pipe end substantially continuously lengthwise along the tapered roller.

In a preferred embodiment, each of the third rollers has one or more tool surfaces thereon. The tool surfaces may include a radiusing/chamfering flange extending radially outwardly from and positioned at an end of each of the third rollers, the radiusing/chamfering flange for preparing the pipe end by forming a radius or chamfer on an end thereof. The tool surfaces may also include a grooving flange extending radially outwardly from each of the third rollers, the grooving flange for preparing the pipe end by forming a groove therein. The tool surfaces also includes a textured surface portion extending outwardly from each of the third rollers, the textured surface portion being positioned in spaced relation to the grooving flange and preparing the pipe end by marking the pipe end in spaced relation to the groove.

Preferably, each of the tool surfaces has a different outer diameter. The tool surfaces rotate at the same angular rate as the roller on which they are mounted, which means that the tool surfaces will have different tangential speeds proportional to their diameter. When the tool surfaces encounter the surface of the pipe end, the smaller diameter tool surfaces will tend to slip or skid relative to the pipe surface because the roller is being driven at an angular rate determined by the largest diameter tool surface and the smaller diameter tool surfaces are moving faster than they normally would if they alone engaged the pipe surface. This results in increased friction, making it difficult to manually turn the tool and pipe relatively to one another. To reduce this friction, it is advantageous to divide the third rollers into separate segments, each segment having a tool surface thereon. Each segment may turn independently of the other thus reducing the friction between the tool surfaces and the pipe end.

It is an object of the invention to provide a tool for preparing pipe ends to be received by mechanical pipe couplings.

It is another object of the invention to provide a tool that is adaptable to pipe ends having different diameters.

It is yet another object of the invention to provide a tool that is adaptable without the need to interchange component parts.

It is again an object of the invention to provide a tool that forms a radius or a chamfer in a pipe end.

It is still another object of the invention to provide a tool that forms a groove in a pipe end.

It is also another object of the invention to provide a tool that places an insertion depth mark on a pipe end.

It is still another object of the invention to provide a tool that prepares pipe ends without distorting the pipe ends out of round.

These and other objects and advantages of the invention will become apparent upon consideration of the drawings and the detailed description of the preferred embodiments which follow.

BRIEF DESCRIPTION OF THE DRAWINGS

FIGS. 5A–5C are back views illustrating the adjustability of the tool for different diameter pipes;

FIG. 6 shows a pipe end prepared using the tool according to the invention; and

DETAILED DESCRIPTION OF THE PREFERRED EMBODIMENT

Figure 1:
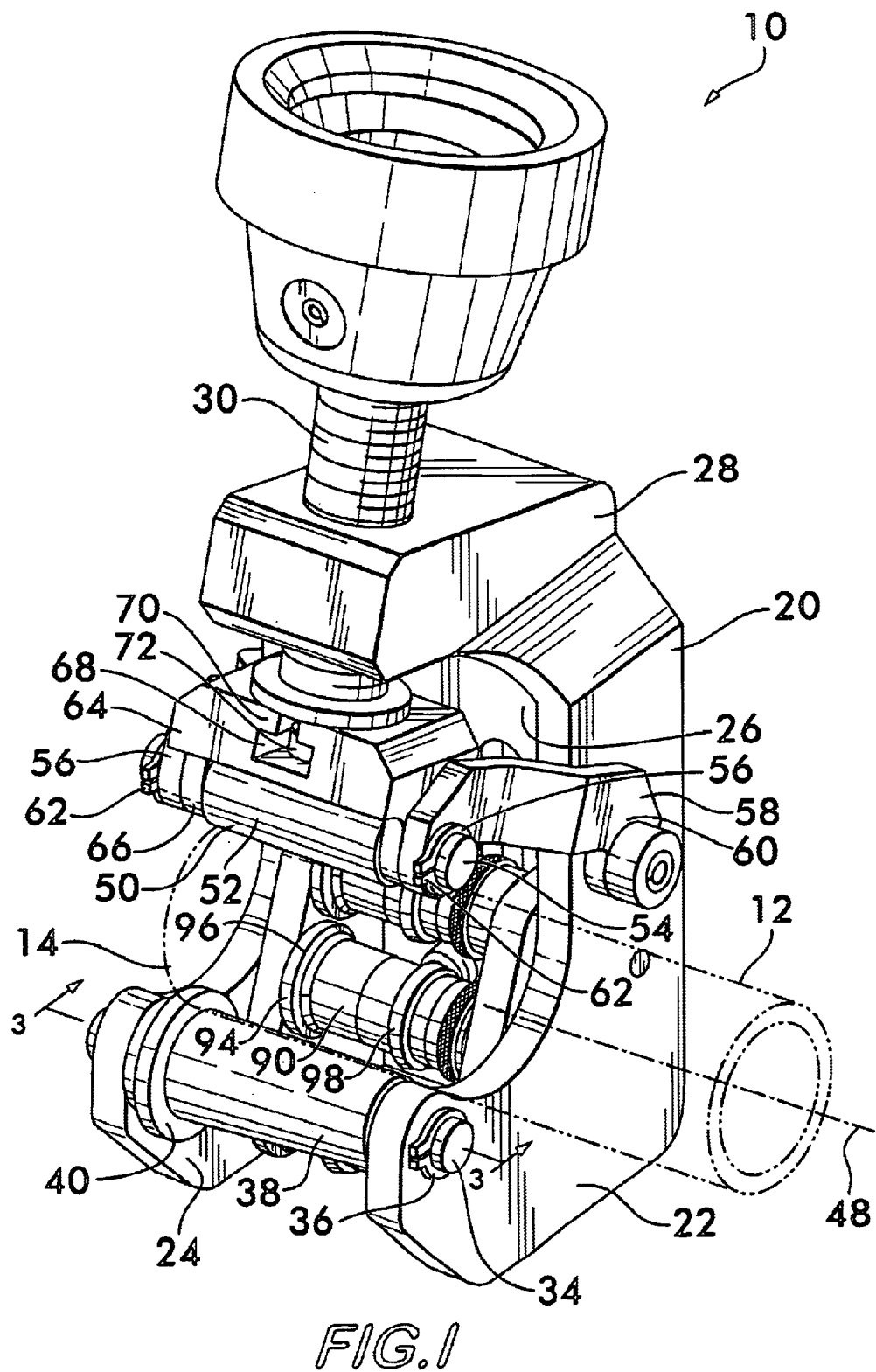
FIG. 1 is a perspective view of a pipe preparation tool according to the invention operating on a pipe end, shown in phantom line.

FIG. 1 shows a pipe preparation tool 10 according to the invention for preparing a pipe end 12, shown in phantom line, to be received by a pipe coupling (not shown). FIG. 6 shows, in detail, pipe end 12 after being worked by pipe preparation tool 10, the pipe end receiving a radiused or a chamfered end 14, a groove 16 positioned in spaced relation to the end 14, and an insertion depth mark 18 positioned in spaced relation to the end 14. Radiusing or chamfering end 14 removes burrs or sharp edges caused when pipe end 12 is cut to a desired length. Radiusing refers to creating a curved surface circumferentially about the end of the pipe and is meant to include any form of curve, not only those having a single determinate radius. Chamfering refers to creating angled faces at the pipe ends. The radiused/chamfered end 14 acts as a lead in, guiding the pipe end 12 into the coupling and reducing the potential for damage to any elastomeric seals in the coupling by burrs or sharp edges. The radiused/chamfered end 14 also allows the use of seal designs having more interference and/or greater radial compression which facilitates effective sealing over a wider range of pipe surface conditions, tolerances and ovality or out of roundness. The groove 16 provides purchase for a retainer mechanism positioned within the coupling, the retainer typically having resilient, angled teeth which engage the groove and prevent removal of the pipe from the coupling. The insertion depth mark 18, when aligned with a reference point on the coupling, provides a convenient visible indication that the pipe end has been inserted properly into the coupling so as to engage the retainer mechanism with the groove 16.

For pipe ends 12 having different diameters, the groove 16 and the insertion depth mark 18 are positioned at different spacings from the end 14. As described in detail below, the tool 10 is adaptable for use with various different pipe diameters with only minor adjustments to its components.

Figure 2:
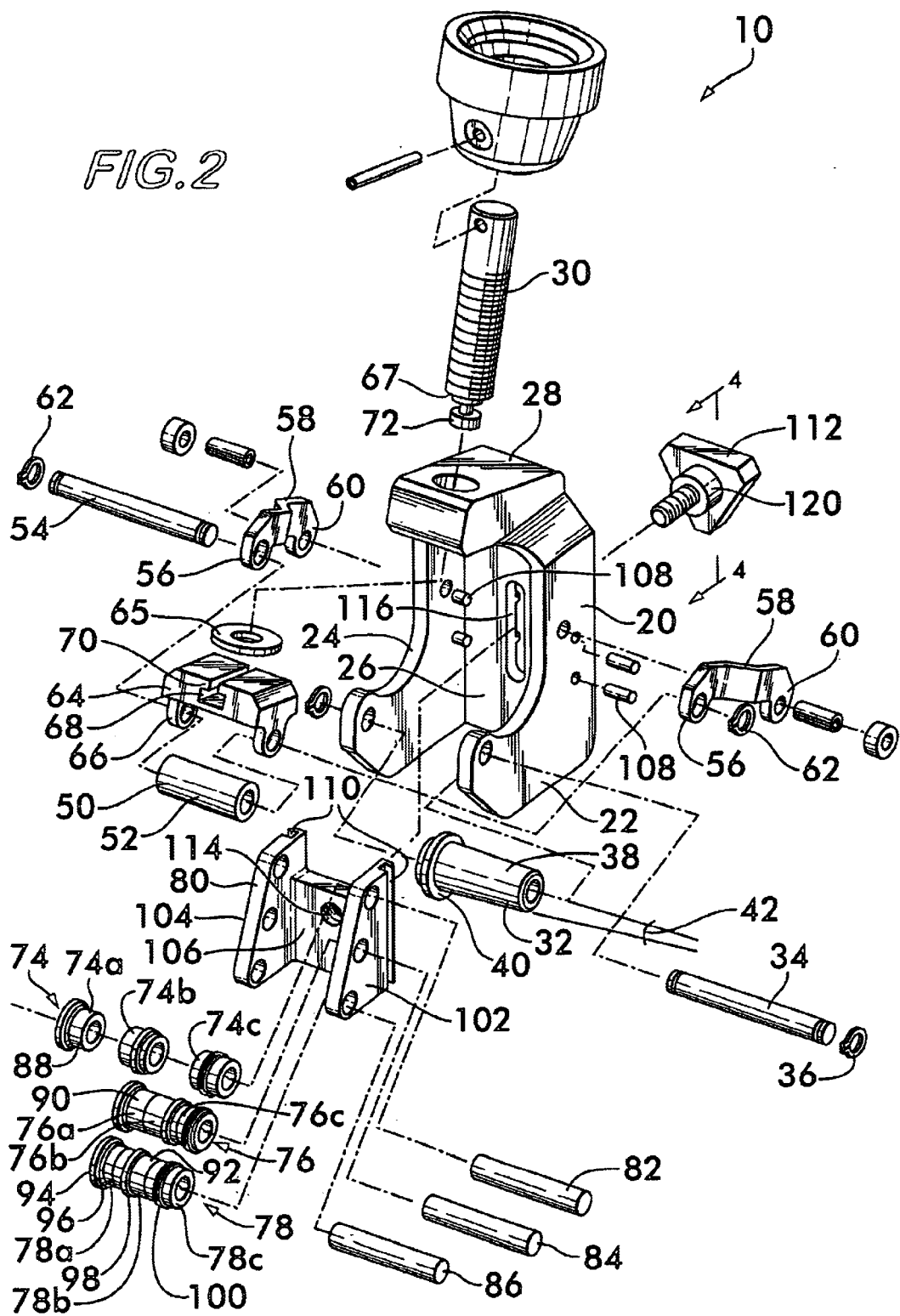
FIG. 2 is an exploded perspective view of the tool shown in FIG. 1.

As best shown in FIG. 2, tool 10 comprises a body 20 which provides a mounting for the various components of the tool. Preferably, body 20 has oppositely arranged cheeks 22 and 24 attached in spaced relation to a back face 26. A head 28 is attached to the back face 26 and the cheeks 22 and 24, the head 28 stiffening the body 20 and providing a mounting for an actuator, preferably in the form of a jack screw 30 described in further detail below.

Figure 3:
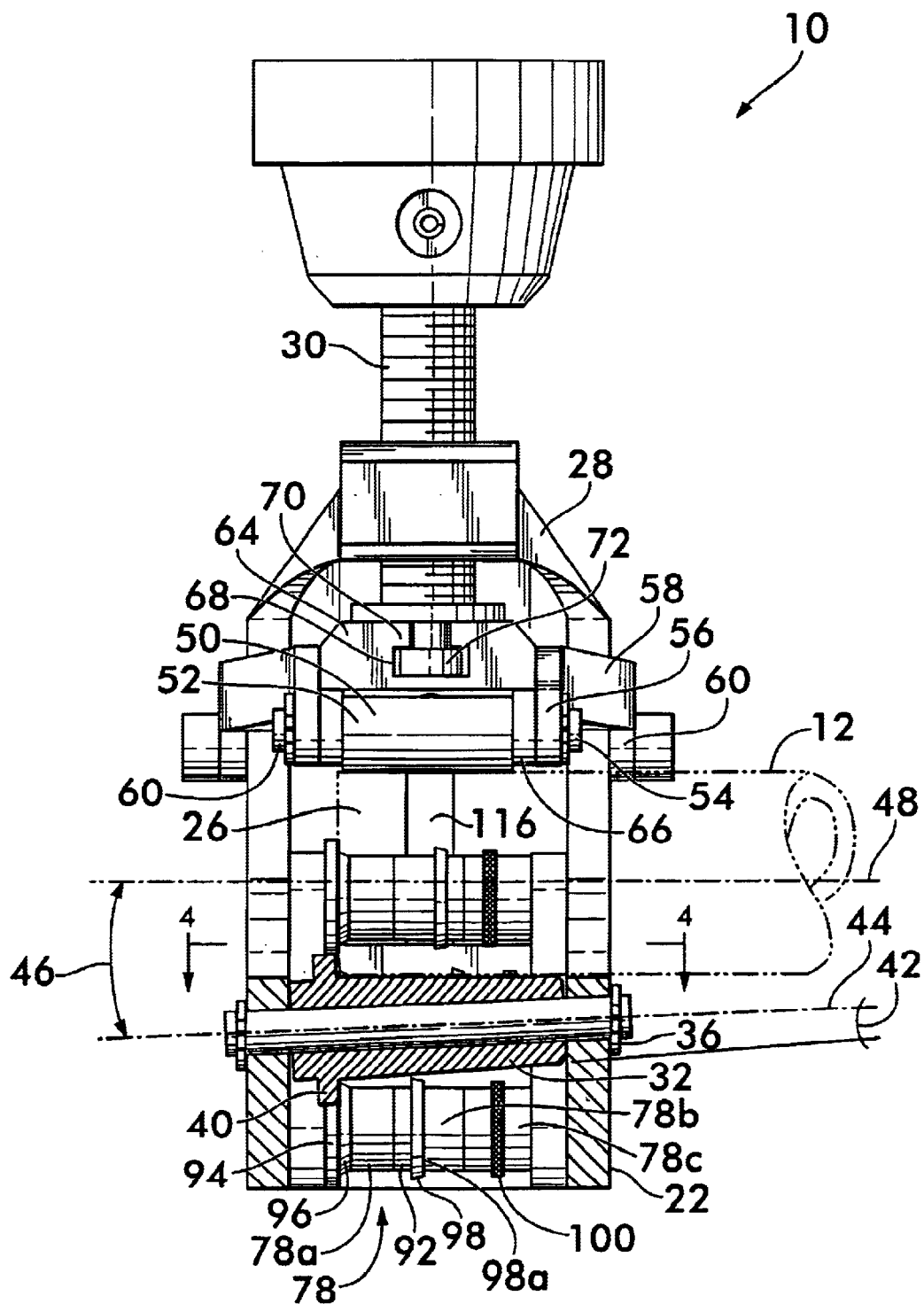
FIG. 3 is a partial sectional front view of the tool shown in FIG. 1.

A tapered roller 32 is rotatably mounted on an axle 34 extending between cheeks 22 and 24. Means, such as snap rings 36 are provided to retain the axle 34 and the tapered roller 32 onto the body 20. Tapered roller 32 has an outwardly facing surface 38 that is engageable with the pipe end 12 to support the pipe end as described below. Tapered roller 32 tapers from a relatively smaller diameter at one end to a larger diameter at the opposite end. A stop flange 40 extends radially outwardly from the outwardly facing surface 38, the stop flange being positioned at the end of the tapered roller having the greater diameter. Preferably, the taper angle 42 of the tapered roller 32 is about 1° but may range as high as 4° for practical applications as described below. As shown in FIG. 3, axle 34, defining an axis of rotation 44 for the tapered roller 32, is set at an angle 46 relative to a central axis 48 along which pipe end 12 coaxially extends. Preferably, angle 46 is substantially the same as the taper angle 42, thus allowing substantially the entire length of the outwardly facing surface 38 of the tapered roller 32 to engage the pipe end 12 as depicted in FIG. 3. Further details of the tapered roller 32 along with its operation are described below.

In certain situations, for example, when radiusing or chamfering is not performed, or when the degree of the radius or chamfer are minor, a cylindrical roller (having no taper) is feasible.

As shown in FIG. 1, pipe end 12 is also supported by a movable roller 50. Movable roller 50 has an outwardly facing surface 52 for engaging the pipe end 12 and is rotatably mounted on an axle 54 (see also FIG. 2). Axle 54 is supported at the free ends 56 of a pair of pivot arms 58, the opposite ends 60 of the pivot arms 58 being pivotally mounted on body 20, allowing the movable roller 50 to be moved generally toward and away from the central axis 48. Snap rings 62 or other means are provided for retaining the axle 54 to free ends 56 of arms 58. Pivot arms 58 are positioned on body 20 proximate to head 28 so that the movable roller 50 can cooperate with the jackscrew 30 or other actuator mounted on the head 28 for effecting movement of the roller generally toward and away from the central axis 48 as shown in FIG. 3. As best shown in FIGS. 1 and 2, connection between the jackscrew 30 and the movable roller 50 is effected by a crosshead 64 and a thrust washer 65. Crosshead 64 has lugs 66 which receive axle 54 and allow the crosshead 64 to rotate relatively to the pivot arms 58 and thereby maintain a substantially perpendicular orientation with the jackscrew 30 as the movable roller 50 is pivoted toward and away from the central axis 48. The jackscrew 30 has a shoulder 67 that engages the thrust washer 65 positioned in contact with the cross head 64. A longitudinal slot 68 is positioned in crosshead 64 facing jackscrew 30. Slot 68 has inwardly extending shoulders 70 that engage a knob 72 on-the end of the jackscrew 30. Rotation of the jackscrew in a clockwise direction advances the movable roller 50 generally toward the central axis 48 through the shoulder 67 bearing against the thrust washer 65 which engages the crosshead 64. Rotation of the jackscrew 30 in the counterclockwise direction draws the movable roller 50 away from the central axis 48 through knob 72 bearing against shoulders 70. During pivoting motion of the pivot arms 58, the slot 68 and thrust washer 65 allow the crosshead 64 to slide relatively to the jackscrew 30 and compensate for the relatively small linear motions of the crosshead in a direction perpendicular to the jackscrew 30.

As best illustrated in FIG. 2, three tool rollers 74, 76 and 78 are rotatably mounted in a carriage 80 on respective axles 82, 84 and 86. Each tool roller has a respective outwardly facing surface 88, 90 and 92 from which various tool surfaces extend radially outwardly. The tool surfaces on the tool rollers may include a radiusing/chamfering flange 94 located at one end, that end being arranged proximate to the stop flange 40 of the tapered roller 32 (see FIG. 3) for reasons explained below. Radiusing/chamfering flange 94 comprises a curved or angled surface 96 which engages the pipe end 12 and creates the radiused or chamfered end 14 (see FIG. 6) when the pipe end is pressed against the radiusing/chamfering flange 94 and rotated relatively thereto. Referring again to FIG. 2, another tool surface comprises a grooving flange 98 which extends radially outwardly from the outwardly facing surface of the tool rollers 74, 76 and 78. The grooving flange 98 creates the groove 16 (see FIG. 6) by cold working the pipe material when the tool roller is forcibly engaged with the pipe end and rotated around its circumference. FIG. 2 also shows a textured surface 100 positioned on each tool roller in spaced relation to the grooving flange. The textured surface 100 comprises yet another type of tool surface and is shown as a knurled portion of the outwardly facing surface 88, 90 and 92 of the tool rollers 74, 76 and 78. The textured surface could be virtually any type or form of marking which marks the pipe end with the insertion depth mark 18 (see FIG. 6) when the textured surface is forcibly engaged with the pipe end 12 and rotated about its circumference.

Each of the tool surfaces, i.e., the radiusing/chamfering flange 94, the grooving flange 98 and the textured surface 100, may have different outer diameters from one another. The different outer diameters result in the various tool surfaces rotating at different tangential speeds relative to one another when the tool surfaces are all turned at the same angular rate, as occurs when one of the tool rollers (74, 76 or 78) from which the surfaces extend is rotated. As the tool surfaces progressively engage the pipe end during tool operation, the smaller diameter tool surfaces will tend to skid across the surface of the pipe end because the larger diameter surfaces will turn them relatively to the pipe at a faster rate than they would normally turn if they engaged the pipe by themselves. This causes increased friction between the tool surfaces and the pipe end, making the tool 10 and the pipe end 12 difficult to turn relatively to one another. To reduce this friction, the tool rollers 74, 76 and 78 are each respectively split into three independently rotatable segments, tool roller 74 into segments 74a, 74b and 74c, tool roller 76 into segments 76a, 76b and 76c and tool roller 78 into segments 78a, 78b and 78c as best shown in FIG. 2. Each tool roller segment has one of the tool surfaces extending from it. For example, tool roller segments 74a, 76a and 78a each have a radiusing/chamfering flange 94, tool roller segments 74b, 76b and 78b each have a grooving flange 98, and tool roller segments 74c, 76c and 78c each have a textured surface 100. By providing each tool surface with its own independently rotating segment, the tool surfaces will not skid as the tool roller engages the pipe surface and friction between the tool and the pipe end is reduced.

Each of the tool rollers 74, 76 and 78 is adapted to prepare a pipe of a particular diameter, and thus, each tool roller has its grooving flange and textured surface at a different position relative to the radiusing/chamfering flange as is appropriate for the particular pipe diameter which the tool roller is intended to prepare.

Figure 4:
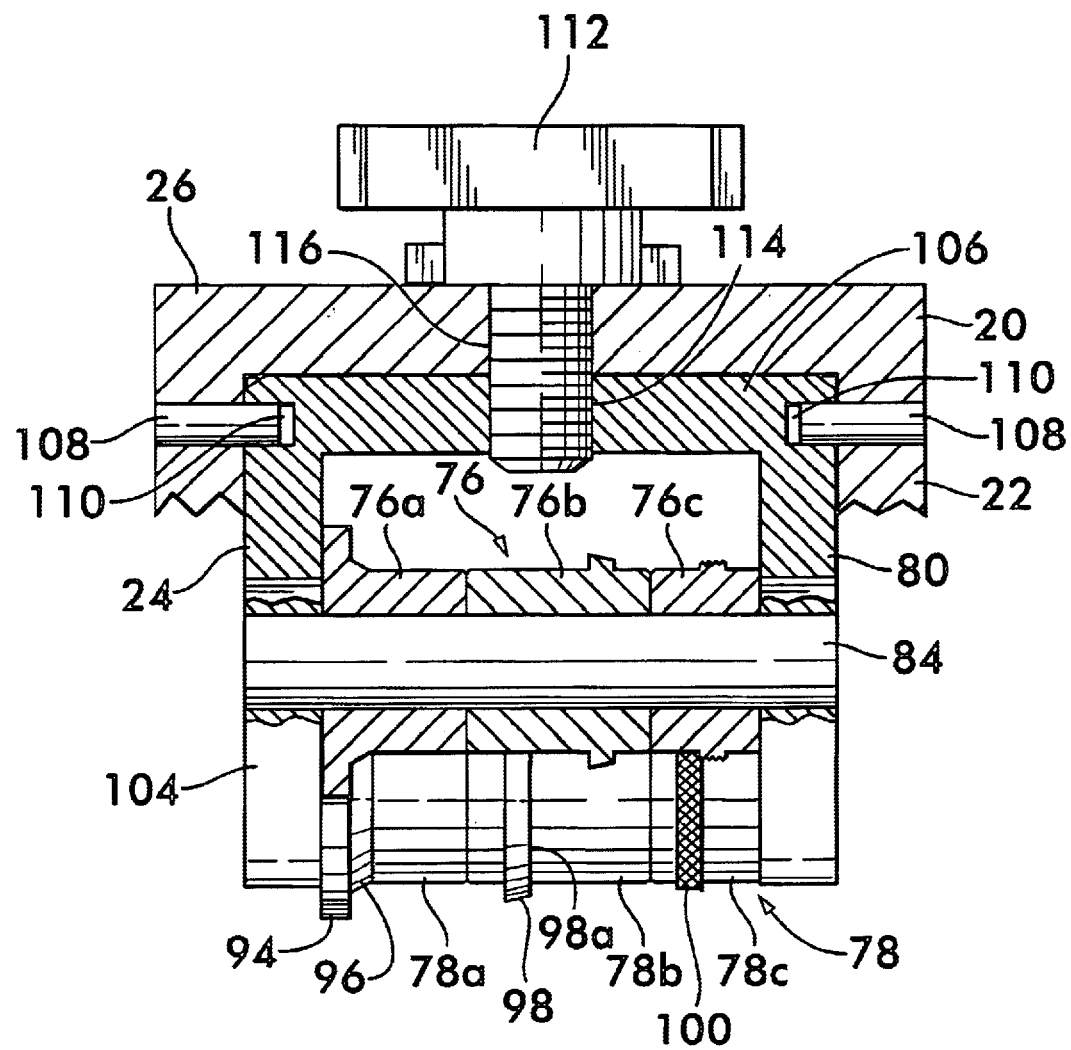
FIG. 4 is a sectional view taken at line 4—4 of FIG. 3.

As best shown in FIGS. 2 and 4, the tool rollers 74, 76 and 78 are mounted on carriage 80 which comprises facing side plates 102 and 104 joined in spaced relation to one another by a back plate 106. The side plates 102 and 104 provide bearings for the axles 82, 84 and 86 on which the tool rollers 74, 76 and 78 are respectively mounted. Carriage 80 is positioned between cheeks 22 and 24 of body 20 with back plate 106 against the body's back face 26 and tool rollers 74, 76 and 78 facing the central axis 48. Preferably the side plates 102 and 104 are trapezoidal in shape to allow each of the tool rollers to be positioned at a different distance from the central axis 48 so that each roller will be able to accommodate a pipe end having a different diameter. Carriage 80 is slidable relatively to body 20 so as to position each tool roller 74, 76 and 78 at the proper angular orientation relative to the movable roller 50 and the tapered roller 32 for supporting the pipe end when the tool 10 engages it. Controlled sliding motion of the carriage 80 relative to the body 20 is afforded by pins 108 which extend inwardly from cheeks 22 and 24 to engage longitudinal slots 110 in the side plates 102 and 104. The carriage may be locked in a particular position by locating screw 112 which engages a threaded hole 114 in back plate 106. The back face 26 of the body 20 has a slot 116 to provide for traversal of the body 20 by the locating screw 112 during positioning of the carriage 80. As shown in FIGS. 5A through 5C, detents 118a; 118b and 118c are located on the back face 26 to provide a means for positively and properly positioning the carriage 80 for a particular diameter pipe end. The detents as shown in the figures take the form of sockets superposed on slot 116 and define locations along the slot within which a shoulder 120 of the locating screw 112 will fit to properly position the carriage 80. Other forms of detent are also feasible. The carriage 80 is positioned by loosening locating screw 112, sliding the carriage 80 on pins 108 relative to body 20 until the locating screw is positioned over the desired detent socket (118a, 118b or 118c) and then tightening the locating screw 112 to engage shoulder 120 with the detent socket to fix the carriage 80 in position.

The relative spacing of the various rollers is such that upon setting the carriage 80 for a particular pipe diameter it is not possible to engage the tool with any other size pipe. This feature ensures that each size pipe will have the proper radius/chamfer, groove and depth indicator mark locations and dimensions.

Operation of the tool 10 is best described with reference to FIGS. 1, 4A–4C, 5A–5C and 7–9. By way of example, the tool 10 comprises three tool rollers and is adaptable to prepare pipe ends of 1 inch nominal diameter, 0.75 inch nominal diameter and 0.5 inch nominal diameter, it being understood that the tool could be designed for more or fewer than three pipe diameters as well as dimensions other than 1 through 0.5 inches.

Figure 7:
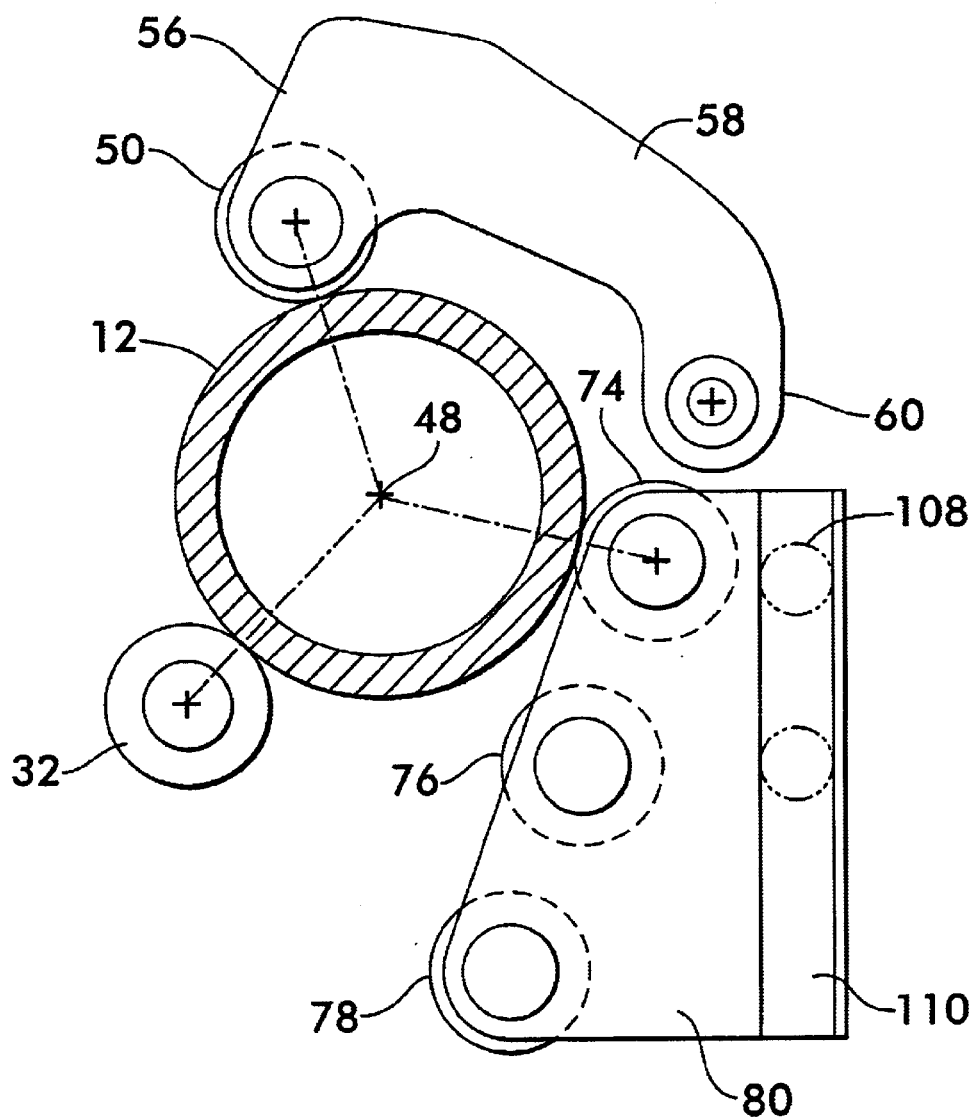
FIGS. 7–9 are views isolating the relatively movable components of the tool and illustrating the adjustability of the tool for different diameter pipes.

As shown in FIG. 5A, the tool is configured for the 1 inch nominal diameter pipe by loosening locating screw 112 and sliding carriage 80 so that the shoulder 120 of locating screw 112 engages the lowest of the detent sockets 118a. As shown in FIG. 7, this action positions the roller tool 74 relative to the movable roller 50 and the tapered roller 32 so as to receive the pipe end 12. The rollers are preferably spaced substantially equiangularly at 120° from one another around the pipe end 12. Equiangular spacing of the rollers helps prevent distortion of the pipe end 12 out of round when force is applied to form the groove and the chamfer. Note that for the 1 inch nominal diameter pipe the roller tool 74 is positioned on carriage 80 at the greatest distance from the central axis 48 so as to properly accommodate the relatively large pipe diameter. The carriage 80 is fixed in its desired position by tightening locating screw 112.

With reference to FIG. 1, the jackscrew 30 is then turned counterclockwise to move the movable roller 50 away from the central axis 48. Increasing this separation allows the pipe end 12 to be positioned against the tool roller 74 and the tapered roller 32 with the end 14 of pipe end 12 against the angled or curved surface 96 of the radiusing/chamfering flange 94. The jackscrew 30 is then turned clockwise to advance the movable roller 50 toward the central axis 48 and into engagement with the pipe end 12 into the configuration shown in FIG. 7. The jackscrew 30 is further tightened and the tool 10 and pipe end 12 are rotated relatively to one another so that the respective outwardly facing surfaces 38, and 52 of the tapered roller 32 and the movable roller 50 as well as the radiusing/chamfering flange 94 and the grooving flange 98 of the tool roller 74 are forcibly engaged with the circumference of the pipe end 12. The movable roller 50 provides the engagement force that causes the radiusing/chamfering flange 94 and the grooving flange 98 to cold work the material of the pipe end 12 and create the radiused/chamfered end 14 and the groove 16 in the pipe end as the tool and pipe end are rotated relative to one another and the jackscrew 30 is gradually turned clockwise to advance the movable roller 50.

Figure 4A:
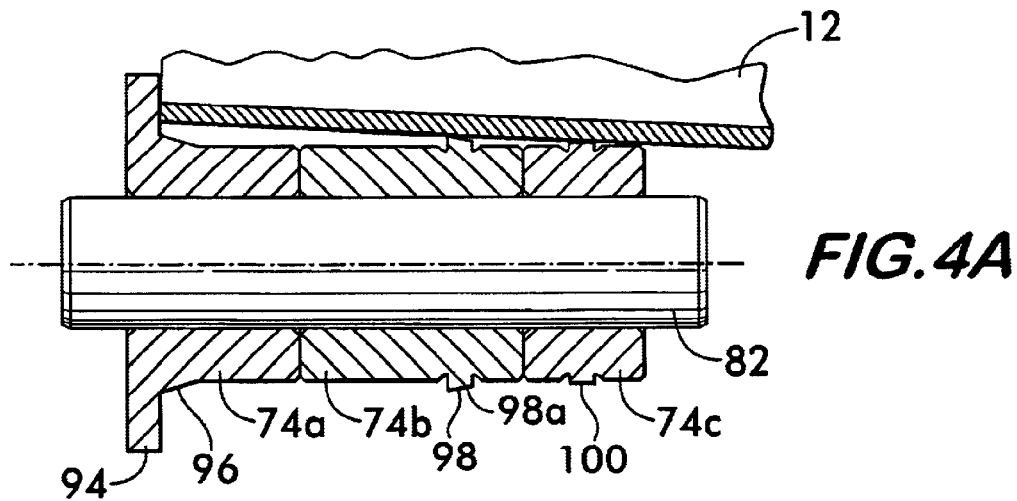
FIGS. 4A–4C are sectional views showing a portion of FIG. 4.

Play in the various rollers, especially the movable roller 50, allows the pipe 12 to rock or teeter about the grooving tool 98 as shown in FIG. 4A. If the teetering is not controlled, then the pipe end 12 may prematurely engage the radiusing/chamfering flange 94 which will tend to push the pipe end 12 away from that flange before the groove is formed in the pipe, thereby failing to properly radius or chamfer the pipe end and place the groove in the wrong location along the pipe end.

Figure 4B:
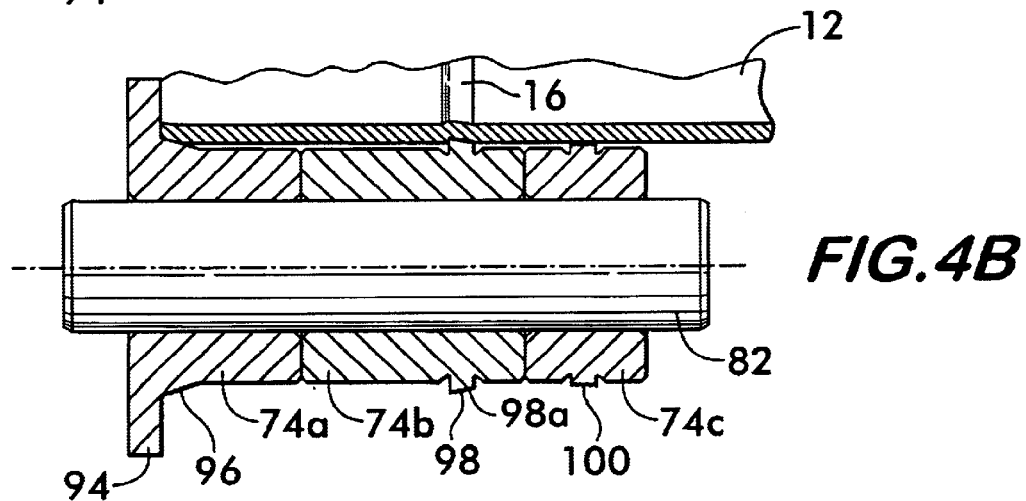
Figure 4C:
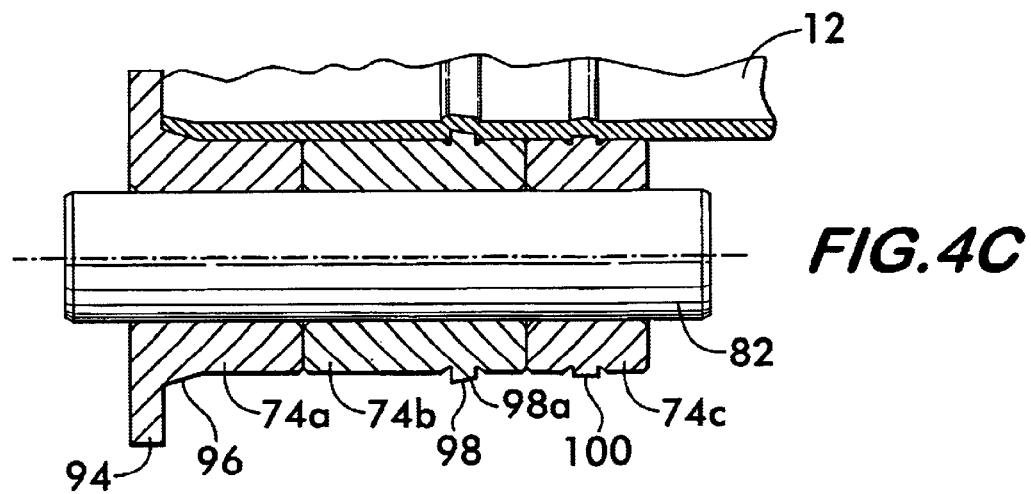

Teetering of the pipe end 12 may be controlled by angularly orienting the circumferential face 98a of the grooving flange 98 at an inclination away from the radiusing/chamfering flange 94. As shown in FIG. 4A, this will cause the pipe 12 to teeter with its end away from the radiusing/chamfering flange 94, allowing the grooving flange 98 to first engage the pipe end and form the groove 16 in the pipe end and then radius or chamfer the end and form the depth indicator mark as best shown in FIGS. 4B and 4C. By first engaging the grooving flange 98, the interaction between the grooving flange and the pipe locks the pipe in place relatively to the tool, the grooving flange 98 bearing within the groove 16 and stopping the pipe from being pushed lengthwise when it engages the radiusing/chamfering flange 94.

As the tool 10 rotates relatively to the pipe end 12, the tapered roller 32 continuously forces the pipe end against the curved or angled surface 96 of the radiusing/chamfering flange 94 to ensure proper radiusing/chamfering of the pipe end 12. This axial force on the pipe forcing it against the radiusing/chamfering flange 94 is caused by the taper angle 42 of the tapered roller 32. If the tapered roller 32 were free to roll on a flat surface; it would tend to roll in a circle having a center toward the end of the roller having the smaller diameter. However, the tapered roller 32 is constrained to roll around the circumference of the pipe end 12 and the frictional forces which would normally tend to move the tapered roller in a circle act on the pipe end and force it toward the end of the tapered roller having the larger diameter. The greater the taper angle 42 the greater the axial force on the pipe end; however, greater taper angles also result in greater friction between the tapered roller 32 and the pipe end 12, making it more difficult to manually turn the tool 10 relatively to the pipe end 12. Taper angles 42 between 1° and 4° have been shown to be practical for manually operated tools as this range of taper angle provides enough axial force on the pipe to ensure a good radius or chamfer without undue friction making the tool too difficult to turn. The friction may also be mitigated by providing a lubricating coating on the outwardly facing surface 38 of the tapered roller 32 or by forming the tapered roller from materials such as polytetrafluoroethylene which have a naturally low coefficient of friction. Note that the tool 10 and the pipe end 12 may be rotated relative to one another in either direction and still effectively prepare the pipe end, there being no preferred direction of rotation.

In the event that a radiused or chamfered pipe end 14 is not desired, the radiusing/chamfering flange 94 will not be included on the tool rollers and the stop flange 40 on the tapered roller 32 will engage the pipe end 14 and prevent axial motion of it to ensure that the groove and insertion depth mark are positioned in the proper spaced relation to the pipe end. In this situation, a cylindrical roller in place of the tapered roller is feasible.

Once the grooving flange 98 has fully penetrated into the pipe end 12 and formed a groove 16 of the desired depth, the outwardly facing surface 88 of the tool roller 74 engages the pipe end. This causes a significant increase in resistance to movement of the movable roller 50 toward the central axis 48 and indicates to the operator that the pipe preparation is complete. Substantially concurrently with completion of the groove formation the textured surface portion 100 of tool roller 74 engages the surface of the pipe end 12 and creates the insertion depth mark 18 shown in FIG. 6. At this point the pipe end 12 is now fully engaged with the outwardly facing surfaces 88 of the roller segments 74a, 74b and 74c. The surfaces 88 act as a stop to prevent deepening of the radius/chamfer, groove or depth indicator mark. It also becomes difficult to rotate the pipe relatively to the tool, providing further indication that pipe preparation is complete. Preparation of the pipe end 12 is now complete and the jackscrew 30 is rotated counterclockwise to move the movable roller away from the central axis 48 and allow the pipe end 12 to be removed form the tool 10.

Figure 8:
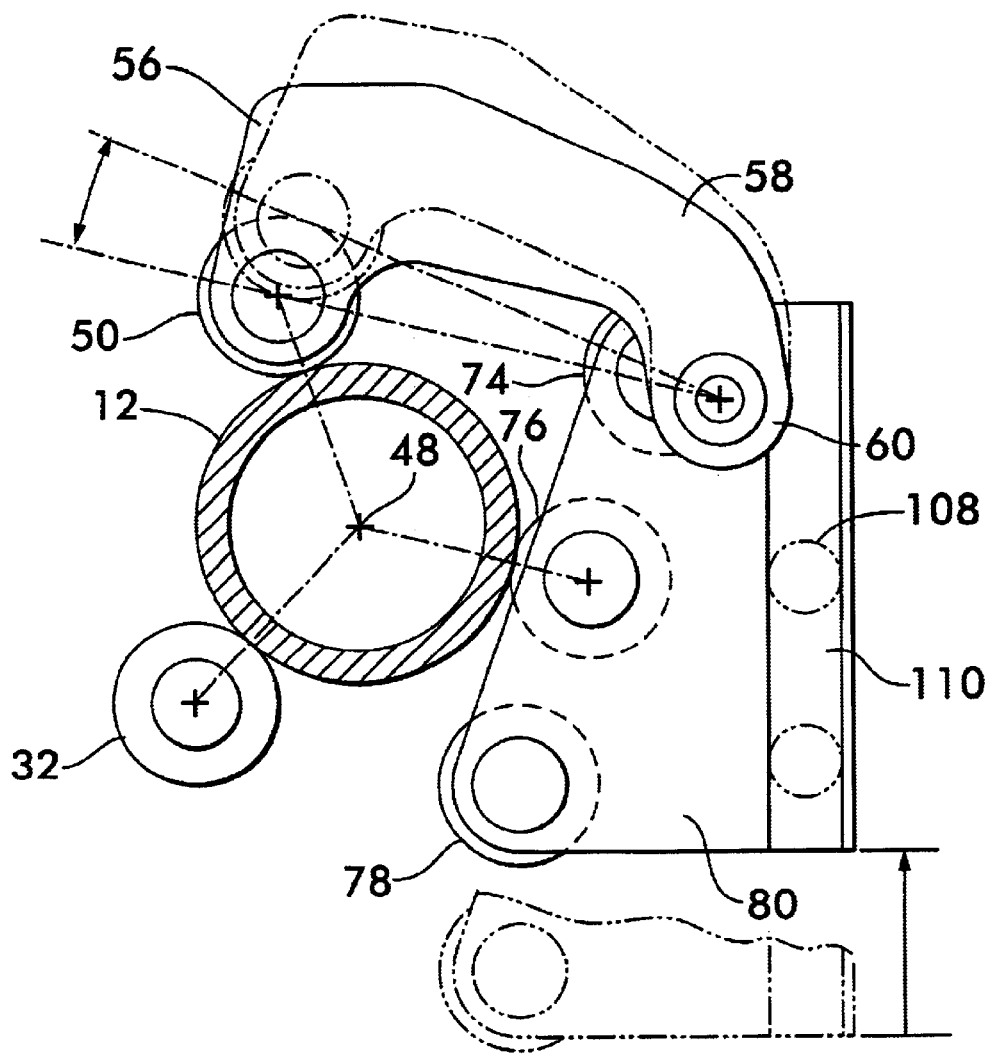
Figure 9:
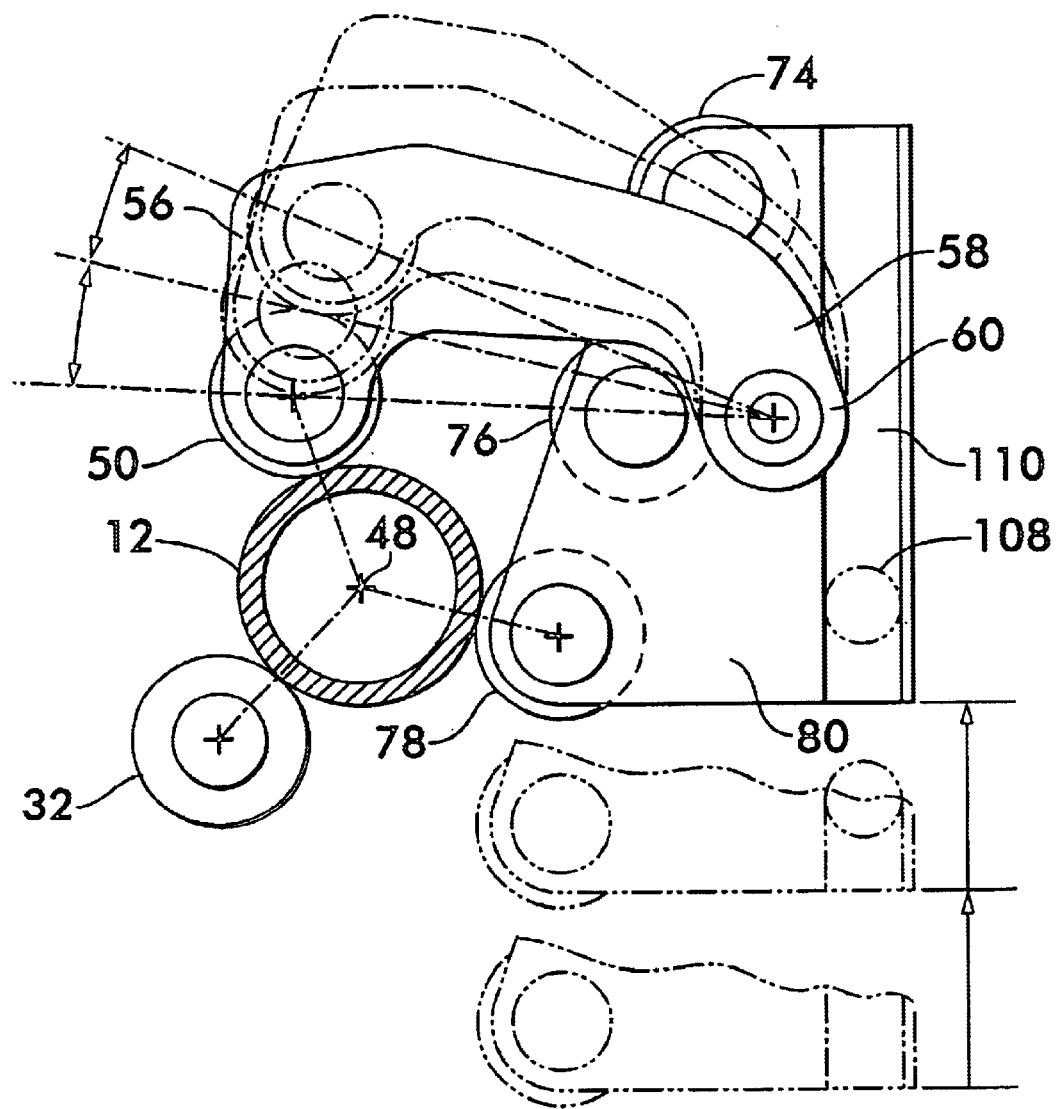

FIGS. 8 and 9 show the relative configuration between the movable roller 50, the tapered roller 32 and the various tool rollers 76 and 78 for different diameter pipe ends 12. In FIG. 8, the 0.75 inch nominal diameter pipe is shown engaged by the middle tool roller 76, the carriage 80 being positioned with the shoulder 120 of locating screw 112 engaging the middle detent socket 118b (see FIG. 5B) to bring the tool roller 76 into proper angular spacing with the movable roller 50 and the tapered roller 32. Similarly, FIG. 9 shows the position of carriage 80 corresponding to the locating screw position of FIG. 5C, to bring tool roller 78 into position so that all of the rollers are substantially equiangularly spaced about the smallest pipe end with a nominal diameter of 0.5 inches. The motion of the carriage 80 and the pivot arms 58 are suggested by phantom lines to indicate how the tool adjusts to accept pipe ends of various diameters. The pivot arms 58 provide an advantage over other means of moving movable roller 50 in that they permit the approximate equiangular spacing to be substantially maintained over a relatively wide range of pipe diameters to ensure a distortion free preparation of the pipe end.

Preferably, tool 10 is made of durable, tough materials of relatively high strength such as stainless steel and aluminum. It is advantageous to form the tool rollers from hardened tool steel for minimum wear and long life.

Pipe preparation tools according to the invention provide a single tool which is conveniently adaptable for use on multiple diameter pipes without the need to substitute or replace individual parts in order to configure the tool for a particular pipe diameter.

What is claimed is:

1. A tool for preparing a pipe end for engaging a mechanical pipe coupling, said tool comprising:

a body;

a first roller rotatably mounted on said body and having a first outwardly facing surface engageable with said pipe end;

a pivot arm having one end pivotally mounted on said body and a free end pivotally movable;

a second roller rotatably mounted on said free end of said pivot arm, said second roller having a second outwardly facing surface engageable with said pipe end;

a third roller rotatably mounted on said body and having a third outwardly facing surface engageable with said pipe end, said rollers being positioned in spaced relation about a central axis said second roller being pivotally movable toward and away from said central axis;

an actuator engageable with said pivot arm for moving said second roller toward and away from said central axis;

said pipe end being positionable along said central axis for engagement with said rollers, said body and said pipe end being rotatable relatively to one another about said central axis so as to engage said rollers circumferentially around said pipe end, said actuator for forcibly engaging said rollers with said pipe end; one of said rollers having a tool surface on said outwardly facing surface for preparing said pipe end.

2. A tool according to claim 1, wherein said rollers are spaced from one another at angles of about 120° about said central axis.

3. A tool according to claim 1, wherein said actuator comprises a jackscrew mounted on said body, said jackscrew engaging said free end of said pivot arm.

4. A tool according to claim 1, wherein another of said rollers has a lengthwise taper angle formed by said other roller having a smaller diameter at one end and a larger diameter at an opposite end.

5. A tool according to claim 4, wherein said taper angle is between about 1° and about 4°.

6. A tool according to claim 4, wherein said other roller has a stop flange extending radially outwardly therefrom and positioned at said end with said larger diameter.

7. A tool according to claim 4, wherein said other roller has an axis of rotation oriented at an angle to said central axis, said angle of said axis of rotation being substantially equal to said lengthwise taper angle so as to permit engagement of said outwardly facing surface of said other roller with said pipe end substantially continuously lengthwise along said other roller.

8. A tool according to claim 7, wherein said other roller is mounted on said body.

9. A tool according to claim 1, wherein said one roller having a tool surface is mounted on said body.

10. A tool according to claim 9, wherein said tool surface is selected from the group consisting of a radiusing flange and a chamfering flange.

11. A tool according to claim 9, wherein said tool surface includes a grooving flange extending radially outwardly from said one roller, said grooving flange being positioned intermediate between ends of said one roller.

12. A tool according to claim 11, wherein said grooving flange comprises an angularly oriented circumferential face engageable with said pipe end.

13. A tool according to claim 11, wherein said tool surface further includes a textured surface portion extending outwardly from said one roller, said textured surface portion being positioned in spaced relation to said grooving flange.

14. A tool according to claim 1, further comprising a carriage movably mounted on said body facing said first and second rollers, said third roller being rotatably mounted on said carriage, said carriage being movable to adjustably position said third roller in spaced relation relative to said first and second rollers.

15. A tool according to claim 14, further comprising a detent positioned on said body adjacent to said carriage and a fastener engaging said carriage and said body, said fastener being engageable with said detent to fix said third roller in said spaced relation to said first and second rollers.

16. A tool according to claim 15, wherein said detent comprises a socket.

17. A tool according to claim 14, further comprising a plurality of third rollers rotatably mounted on said carriage, said third rollers each being positioned at a different distance from said central axis, said carriage being movable so as to adjustably position each of said third rollers in a predetermined spaced relation to said first and said second rollers one at a time, thereby adapting said tool to accommodate pipe ends having varying diameters.

18. A tool according to claim 17, wherein said third rollers each have said tool surface thereon.

19. A tool according to claim 1, wherein said one roller comprises a plurality of adjacent segments rotatable about a common axis independently of one another.

20. A tool for preparing a pipe end for engaging a mechanical pipe coupling, said tool comprising:
   a body;
   a plurality of rollers rotatably mounted on said body, each of said rollers having an outwardly facing surface engageable with said pipe end, said rollers being positioned in spaced relation about a central axis;
   one of said rollers being a tool roller having a plurality of tool surfaces on said outwardly facing surface for preparing said pipe end;
   one of said rollers being a movable roller movable toward and away from said central axis;
   one of said rollers being a tapered roller having a lengthwise taper angle formed by said tapered roller having a smaller diameter at one end and a larger diameter at an opposite end;
   said tool including an actuator mounted on said body for moving said movable roller toward and away from said central axis; and
   said pipe end being positionable along said central axis for engagement with said rollers, said body and said pipe end being rotatable relatively to one another about said central axis so as to engage said rollers circumferentially around said pipe end, said actuator for forcibly engaging said rollers with said pipe end.

21. A tool according to claim 20, wherein said tapered roller has an axis of rotation oriented at an angle to said central axis, said angle of said axis of rotation being substantially equal to said lengthwise taper angle so as to permit engagement of said outwardly facing surface of said tapered roller with said pipe end substantially continuously lengthwise along said tapered roller.

22. A tool according to claim 20, wherein said tapered roller has a stop flange extending radially outwardly therefrom and positioned at said end with said larger diameter.

23. A tool according to claim 20, further comprising a pivot arm having one end pivotally mounted on said body and a free end pivotally movable toward and away from said central axis, said movable roller being rotatably mounted on said free end of said pivot arm, said actuator engaging said pivot arm for moving said movable roller toward and away from said central axis.

24. A tool according to claim 23, wherein said actuator comprises a jackscrew mounted on said body, said jackscrew engaging said free end of said pivot arm.

25. A tool according to claim 20, wherein said tool surface is selected from the group consisting of a radiusing flange and a chamfering flange.

26. A tool according to claim 25, wherein said tool surfaces include a grooving flange extending radially outwardly from said tool roller, said grooving flange being positioned intermediate between ends of said tool roller.

27. A tool according to claim 26, wherein said grooving flange comprises an angularly oriented circumferential face engageable with said pipe end.

28. A tool according to claim 26, wherein said tool surfaces include a textured surface portion extending radially outwardly from said tool roller, said textured surface portion being positioned in spaced relation to said grooving flange.

29. A tool according to claim 28, wherein said tool roller comprises a plurality of adjacent segments rotatable about a common axis independently of one another, each of said segments having one of said tool surfaces positioned thereon.

30. A tool according to claim 20, further comprising a carriage movably mounted on said body facing said central axis, one of said rollers being rotatably mounted on said carriage, said carriage being movable to adjustably position said one roller mounted on said carriage in spaced relation relative to other said rollers.

31. A tool according to claim 30, further comprising a detent positioned on said body adjacent to said carriage and a fastener engaging said carriage and said body, said fastener being engageable with said detent to fix said third roller in said spaced relation to said first and second rollers.

32. A tool according to claim 31, wherein said detent comprises a socket.

33. A tool according to claim 30, wherein said tool roller is mounted on said carriage.

34. A tool according to claim 33, further comprising a plurality of tool rollers rotatably mounted on said carriage, said tool rollers each being positioned at a different distance from said central axis, said carriage being movable so as to adjustably position each of said tool rollers in a predetermined spaced relation to said movable roller and said tapered roller one at a time, thereby adapting said tool to accommodate pipe ends having varying diameters.

35. A tool according to claim 34, wherein said tool rollers, said movable roller and said tapered roller are positionable substantially equiangularly from one another.

36. A tool for preparing a pipe end for engaging a mechanical pipe coupling, said tool comprising:
   a body;
   a first roller rotatably mounted on said body and having a first outwardly facing surface engageable with said pipe end;
   a second roller rotatably mounted on said body and having a second outwardly facing surface engageable with said pipe end, said second roller being movable relatively to said body;
   a carriage movably mounted on said body facing said first and second rollers, a plurality of third rollers being rotatably mounted on said carriage, each of said third rollers having an outwardly facing surface engageable with said pipe end, said first, second and third rollers being positioned in spaced relation about a central axis;

an actuator mounted on said body for moving said second roller toward and away from said central axis, said third rollers each being positioned at a different distance from said central axis, said pipe end being positionable along said central axis for engagement with said rollers, said body and said pipe end being rotatable relatively to one another about said central axis so as to engage said rollers circumferentially around said pipe end, said actuator for forcibly engaging said rollers with said pipe end, one of said rollers having a tool surface on said outwardly facing surface for preparing said pipe end, said carriage being movable so as to adjustably position each of said third rollers in a predetermined spaced relation to said first and second rollers one at a time, thereby adapting said tool to accommodate pipe ends having varying diameters.

37. A tool according to claim 36, further comprising a pivot arm having one end pivotally mounted on said body and a free end pivotally movable toward and away from said central axis, said second roller being rotatably mounted on said free end of said pivot arm, said actuator engaging said pivot arm for moving said movable roller toward and away from said central axis.

38. A tool according to claim 37, wherein said actuator comprises a jackscrew mounted on said body, said jackscrew engaging said free end of said pivot arm.

39. A tool according to claim 36, wherein one of said rollers comprises a tapered roller having a lengthwise taper angle formed by said tapered roller having a smaller diameter at one end and a larger diameter at an opposite end.

40. A tool according to claim 39, wherein said tapered roller has an axis of rotation oriented at an angle to said central axis, said angle being substantially equal to said taper angle so as to permit engagement of said outwardly facing surface of said tapered roller with said pipe end substantially continuously lengthwise along said tapered roller.

41. A tool according to claim 36, wherein each of said third rollers has said tool surface thereon.

42. A tool according to claim 36, wherein said tool surface is selected from the group consisting of a radiusing flange and a chamfering flange.

43. A tool according to claim 36, wherein said tool surface includes a grooving flange extending radially outwardly from one of said third rollers.

44. A tool according to claim 43, wherein said grooving flange comprises an angularly oriented circumferential face engageable with said pipe end.

45. A tool according to claim 43, wherein said tool surface includes a textured surface portion extending outwardly from said one of said third rollers, said textured surface portion being positioned in spaced relation to said grooving flange.

* * * * *